United States Patent
Sjöö

(10) Patent No.: US 9,878,384 B2
(45) Date of Patent: Jan. 30, 2018

(54) CUTTING INSERT AND POWER SKIVING TOOL

(71) Applicant: SANDVIK INTELLECTUAL PROPERTY AB, Sandviken (SE)

(72) Inventor: Sture Sjöö, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 435 days.

(21) Appl. No.: 14/794,454

(22) Filed: Jul. 8, 2015

(65) Prior Publication Data

US 2016/0008900 A1   Jan. 14, 2016

(30) Foreign Application Priority Data

Jul. 9, 2014   (EP) ..................................... 14176367

(51) Int. Cl.
*B23C 5/08*     (2006.01)
*B23F 21/00*    (2006.01)
(Continued)

(52) U.S. Cl.
CPC .......... *B23F 21/106* (2013.01); *B23B 27/145* (2013.01); *B23F 5/163* (2013.01); *B23F 21/046* (2013.01); *B23B 2200/0423* (2013.01); *B23B 2205/12* (2013.01); *B23C 5/20* (2013.01); *B23C 5/22* (2013.01)

(58) Field of Classification Search
CPC ........ B23B 2200/0423; B23B 2205/12; B23B 27/145; B23F 21/046; B23F 21/106; B23F 21/128; B23F 21/146; B23F 5/163; B23C 5/20; B23C 5/08; B23C 5/207; B23C 5/2273; B23C 5/22; Y10T 407/23; Y10T 407/1924; Y10T 407/19; Y10T 407/192; Y10T 407/1685; Y10T 407/1745; Y10T 407/1926
See application file for complete search history.

(56) References Cited

U.S. PATENT DOCUMENTS 3,142,110 A * 7/1964 Karl Hertel ............. B23B 27/16
                                                    407/109
4,552,492 A * 11/1985 Komanduri ........... B23B 27/145
                                                    407/114
(Continued)

FOREIGN PATENT DOCUMENTS

DE    102012011956 B3   12/2013
JP    H05116018 A       5/1993
WO    03/045613         6/2003

*Primary Examiner* — Sunil K Singh
*Assistant Examiner* — Nicole N Ramos
(74) *Attorney, Agent, or Firm* — Corinne R. Gorski (57) ABSTRACT

Herein a cutting insert for a power skiving tool is disclosed. The cutting insert includes an insert body having a bottom surface extending in a first plane, and a body axis extending substantially in parallel with the first plane. The insert body has a cutting end portion and opposite thereto, an abutment surface. The abutment surface extends substantially perpendicularly to the body axis and to the first plane. The cutting end portion is provided with a first and a second cutting edge, the first cutting edge and the second cutting edge being directed in a same cutting direction. Herein, further a power skiving tool including such cutting inserts is disclosed.

22 Claims, 4 Drawing Sheets

(51) Int. Cl.
   *B23F 21/10*    (2006.01)
   *B23F 21/04*    (2006.01)
   *B23F 5/16*     (2006.01)
   *B23B 27/14*    (2006.01)
   B23C 5/22       (2006.01)
   B23C 5/20       (2006.01)

(56) References Cited

U.S. PATENT DOCUMENTS

| | | | | |
|---|---|---|---|---|
| 4,720,220 A * | 1/1988 | Bloch | ............... | B23F 21/083 407/118 |
| 5,209,611 A * | 5/1993 | Drescher | ............... | B23C 5/08 407/114 |
| 5,593,254 A * | 1/1997 | Peters | ............... | B23C 5/2204 407/48 |
| 8,277,151 B2 * | 10/2012 | Wandeback | ............... | B23C 5/06 407/113 |
| 2003/0123938 A1 | 7/2003 | Grehn | | |
| 2008/0206007 A1 * | 8/2008 | Hughes | ............... | B23C 3/30 409/51 |
| 2010/0183386 A1 * | 7/2010 | Heinloth | ............... | B23B 5/18 407/113 |
| 2013/0156515 A1 * | 6/2013 | Satran | ............... | B23C 5/207 407/48 |
| 2013/0294851 A1 * | 11/2013 | S Gstrom | ............... | B23F 21/128 407/48 |
| 2014/0010606 A1 | 1/2014 | Sagstrom et al. | | |
| 2014/0010607 A1 * | 1/2014 | Wandeback | ............... | B23F 21/128 407/113 |
| 2015/0063927 A1 * | 3/2015 | Sjoo | ............... | B23F 21/106 407/28 |
| 2015/0321276 A1 * | 11/2015 | Sjoo | ............... | B23F 21/166 407/25 |

* cited by examiner

CUTTING INSERT AND POWER SKIVING TOOL

RELATED APPLICATION DATA

This application claims priority under 35 U.S.C. § 119 to EP Patent Application No. 14176367.2 filed on Jul. 9, 2014, which the entirety thereof is incorporated herein by reference.

TECHNICAL FIELD

The present disclosure relates to a cutting insert and to a rotatable power skiving tool utilizing the cutting insert.

BACKGROUND

Cutting tooth grooves in an element to form teeth of a toothed element such as a cog wheel, wherein an element includes splines, etc., requires specifically designed and shaped cutting tools to cut flanks of the teeth and to reach a bottom root between the teeth.

Various methods for cutting tooth grooves are known. One method, referred to as power skiving uses a rotating cutting tool and a rotating workpiece. Inside as well as outside teeth may be cut by power skiving. The rotation of the cutting tool is synchronised with the rotation of the workpiece as the cutting tool is feed in cutting engagement with the workpiece in an axial direction of the workpiece. For example U.S. Pat. No. 4,066,001 discloses a solid power skiving tool which may be reground to ensure sharp cutting edges.

The use of replaceable cutting inserts in a power skiving tool is known. In one known power skiving tool cutting inserts of a rhombus shape are used, such as cutting inserts of VBMT type commonly used in turning tools.

SUMMARY

The present disclosure provides a cutting insert for a power skiving tool, which cutting insert allows cutting complete tooth grooves in less passes than in the above known type of cutting insert.

According to an aspect of the disclosure, the cutting insert includes an insert body having a bottom surface generally extending in a first plane and being configured to abut against a corresponding surface of a power skiving tool, an upper surface extending opposite to the bottom surface, and a body axis extending substantially in parallel with the first plane. Seen along the body axis, the insert body includes a cutting end portion and opposite thereto an abutment surface configured to abut against a corresponding surface of a power skiving tool. The abutment surface extends substantially perpendicular to the body axis and to the first plane. The cutting end portion is provided with a first cutting edge and a second cutting edge, the first cutting edge and the second cutting edge being directed in a same cutting direction. The first cutting edge extends along an edge portion of the upper surface and the second cutting edge extends in a second plane, the second plane being substantially parallel with the first plane and extending between the upper surface and the first plane, and seen along a normal to the first plane at least a portion of the second cutting edge extends from the insert body beyond the first cutting edge.

During use of the cutting insert, for each pass of the cutting insert along a relevant workpiece, a deeper cutting depth may be provided than with a cutting insert having only one cutting edge. Moreover, since for space reasons, inevitably the second cutting edge will have a smaller cutting depth than the first cutting edge, teeth cut by a power skiving tool including such cutting inserts may have a less rough surface than teeth cut by a prior art power skiving tool. Thus, in some practical applications of elements having teeth cut in this manner, any further finishing operation may not be required. Whereas elements having teeth cut using prior art power skiving tools, in most practical applications, require a subsequent finishing operation, such as a fine cutting operation or a grinding operation.

The cutting insert may be manufactured from a material e.g. comprising one or more of cemented carbide, ceramics, cubic boron nitride, polycrystalline diamond, and cermet. The cutting insert may be coated with surface coatings such as titanium nitride, titanium carbonitride, and/or aluminium oxide. The cutting insert is arranged to be held in a power skiving tool. Accordingly, the cutting insert is configured to cut tooth grooves in an element to form teeth of a toothed element such as inside or outside cog wheels, elements comprising splines, etc. Only the cutting end portion may be provided with cutting edges.

According to embodiments, the upper surface may extend substantially in parallel with the first plane. In this manner the first cutting edge may be arranged substantially in parallel with the first plane.

According to embodiments, each of the first and second cutting edges may include a nose edge portion, a first lateral edge portion, and a second lateral edge portion, the nose edge portion merging into the first lateral edge portion and the second lateral edge portion. In this manner, each of the first and second cutting edges may be devised to cut a tooth groove, the nose edge portion for cutting at least a portion of a tooth bottom, i.e. the root between two adjacent teeth of a toothed element, and the first and second lateral edge portions for cutting flanks of adjacent teeth on both sides of a tooth groove.

According to embodiments, each of the first and second cutting edges may have a first ending edge portion and a second ending edge portion. The first lateral edge portion may extend at an acute angle to the body axis and may merge into the first ending edge portion and the second lateral edge portion may extend at an acute angle to the body axis and may merge into the second ending edge portion. At least a portion of the first ending edge portion may extend at a less acute angle to the body axis than the first lateral edge portion and at least a portion of the second ending edge portion may extend at a less acute angle to the body axis than the second lateral edge portion, such that the first ending edge portion and the second ending edge portion may be arranged to cut tip portions of teeth. In this manner a complete tooth groove between adjacent teeth of toothed elements may be cut with the cutting insert, the adjacent teeth having tip portions shaped by the first and second ending edge portions.

According to embodiments, each of the first and second cutting edges may be configured to cut with the first ending edge portion, the first lateral edge portion, the nose edge portion, the second lateral edge portion, and the second ending edge portion in one cutting pass on a workpiece. In this manner the one or more last cutting passes in an element may shape tip portions of, flank portions of, and root portions between, two adjacent teeth. Completely shaped tooth grooves between adjacent teeth having shaped tip portions may thus be cut by the cutting insert.

According to embodiments, the first lateral edge portion may have a convexly shaped portion adjacent to a concavely shaped portion and the second lateral edge portion may have a convexly shaped portion. In this manner involute tooth flanks on both sides of a tooth groove of an inside cog wheel may be cut.

According to embodiments, the cutting insert may include a third cutting edge, wherein the third cutting edge may extend in a third plane. The third plane may be substantially parallel with the first plane and may extend between the second plane and the first plane. The third cutting edge may have a nose edge portion, a first lateral edge portion, and a second lateral edge portion, the nose edge portion may merge into the first lateral edge portion and the second lateral edge portion. In this manner the cutting insert may provide an even deeper cutting depth with also the third cutting edge engaging with a relevant workpiece. The third cutting edge may provide a finishing cut in a workpiece following a cut of the second cutting edge.

According to embodiments, seen along the body axis opposite to the cutting end portion, the insert body may include a positioning end portion configured to position the cutting insert in a power skiving tool, the upper surface being delimited by two right angle corner portions in the positioning end portion. An edge of the abutment surface may form an edge of the two right angle corner portions. Only the cutting end portion may be provided with cutting edges. In this manner the cutting insert may be reliably positioned in an insert seat of a power skiving tool.

According to embodiments, the positioning end portion may have a substantially rectangular shape as seen along the normal of the first plane. The positioning end portion may have a width which is wider than a width of the cutting end portion, in a direction perpendicularly to the body axis and in parallel with the first plane. In this manner the cutting insert may be reliably positioned in a power skiving tool.

According to embodiments, a through hole may extend through the insert body between the bottom surface and the upper surface of the insert body, at least partially in the positioning end portion or entirely in the positioning end portion. In this manner, the cutting insert may be held securely in position against a seat bottom surface of a power skiving tool, by a screw or other attachment arrangement extending at least partially through the through hole.

According to embodiments, the bottom surface may be provided with at least one ridge and/or at least one groove extending in parallel with the body axis and may be configured to mesh with at least one corresponding groove and/or ridge of a power skiving tool. A thus provided serrated bottom surface may ensure a safe positioning of the cutting insert in a power skiving tool. Moreover, the cutting insert may be fine positioned in a direction along the body axis, since the at least one ridge and/or groove permits the cutting insert to be slid along a seat bottom surface of the power skiving tool.

It is a further object of the present disclosure to provide a power skiving tool, which allows cutting complete tooth grooves in less cutting passes than known types of power skiving tools.

According to an aspect of the disclosure, a rotatable power skiving tool includes a generally circular tool body having a center axis about which the power skiving tool is rotatable. The tool body comprises a number of peripherally arranged insert seats arranged on one side of a reference plane, the reference plane extending perpendicularly to the center axis. The insert seats face away from the reference plane. The power skiving tool includes a cutting insert, according to any one aspect and/or embodiment discussed herein, arranged in each insert seat.

According to embodiments, a seat bottom surface of each insert seat, in a direction radially from the center axis, forms an angle within a range of 2-15 degrees, for example, approximately 10 degrees, with the reference plane. In this manner the cutting insert may cut easily in the workpiece at a comparatively low sound level.

According to embodiments, the seat bottom surface of each insert seat, in a direction tangential to the generally circular tool body, may form an angle of a maximum of 30 degrees, for example approximately 20 degrees, with the reference plane. In this manner each of the first and second cutting edges of the cutting inserts will engage gradually with a relevant workpiece, i.e. the first lateral edge portion will engage first with the workpiece before the nose edge portion and eventually the second lateral edge portion, which engages after the nose edge portion.

According to embodiments, the seat bottom surface of each insert seat may be provided with ridges and grooves. Thus, a serrated support surface for a relevant cutting insert may be provided.

According to embodiments, the power skiving tool may include an adjusting mechanism for adjusting a radial position of the cutting insert arranged radially inside of each insert seat, the adjusting mechanism abutting against the abutment surface of the cutting insert. In this manner, the cutting insert may be fine positioned in a direction along the body axis of the cutting insert. In order to ensure a reliable production of toothed elements, the cutting inserts may require a radial fine positioning within a range of 0.001-0.01 mm. A suitable adjusting mechanism may be an adjusting mechanism as disclosed in WO 03/045613.

Further features of, and advantages with, the present disclosure will become apparent when studying the appended claims and the following detailed description.

BRIEF DESCRIPTION OF THE DRAWINGS

Various aspects of the disclosure, including its particular features and advantages, will be readily understood from the example embodiments discussed in the following detailed description and the accompanying drawings, in which.

DETAILED DESCRIPTION

Aspects of the present disclosure will now be described more fully. Like numbers refer to like elements throughout. Well-known functions or constructions will not necessarily be described in detail for brevity and/or clarity. As used herein, the term "comprising" or "comprises" is open-ended, and includes one or more stated features, elements, steps, components or functions but does not preclude the presence or addition of one or more other features, elements, steps, components, functions or groups thereof.

FIGS. 1a-1e illustrate various views of a cutting insert 2 according to the embodiments. The cutting insert 2 is configured for use in a power skiving tool. The cutting insert 2 includes an insert body 4. The insert body 4 has a bottom surface 6 and an upper surface 8 extending opposite to the bottom surface 6. Side surfaces of the insert body 4 extend between the bottom surface 6 and the upper surface 8. The bottom surface 6 extends generally in a first plane 10 and a body axis 12 extends substantially in parallel with the first plane 10. The bottom plane 10 extends in parallel with the plane of the view of FIG. 1c. The upper surface 8 extends substantially in parallel with the first plane 10. The bottom surface 6 is configured to abut against a corresponding seat bottom surface of a relevant power skiving tool.

As seen along the body axis 12, the insert body 4 has a cutting end portion 14 and opposite thereto, a positioning end portion 16. At the positioning end portion 16 the insert body 4 includes an abutment surface 18 configured to abut against a corresponding surface of a relevant power skiving tool. The abutment surface 18 extends substantially perpendicularly to the body axis 12 and perpendicularly to the first plane 10. The thus provided abutment surface 18 is suitable for transferring cutting forces to a portion of a power skiving tool. As discussed with reference to FIGS. 4 and 5 below, the abutment surface 18 also serves as a surface, against which an adjusting mechanism for adjusting a radial position of the cutting insert abuts.

According to the embodiments, a through hole 19 extends through the insert body 4 between the bottom surface 6 and the upper surface 8 of the insert body 4, at least partially in the positioning end portion 16. In these embodiments, the through-hole 19 is positioned entirely in the positioning end portion 16. In this manner the cutting 2 insert may be held securely in position against a power skiving tool, by a screw or other attachment arrangement extending at least partially through the through-hole 19.

Figure 1A:
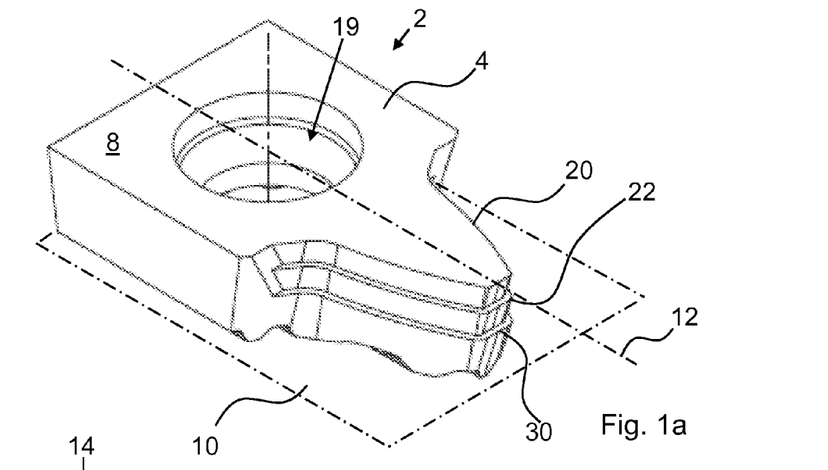
FIGS. 1a-1e illustrate various views of a cutting insert according to the embodiments.
Figure 1B:
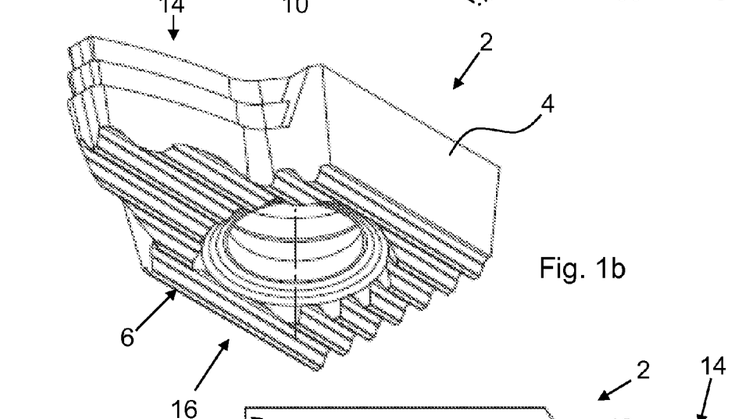
Figure 1C:
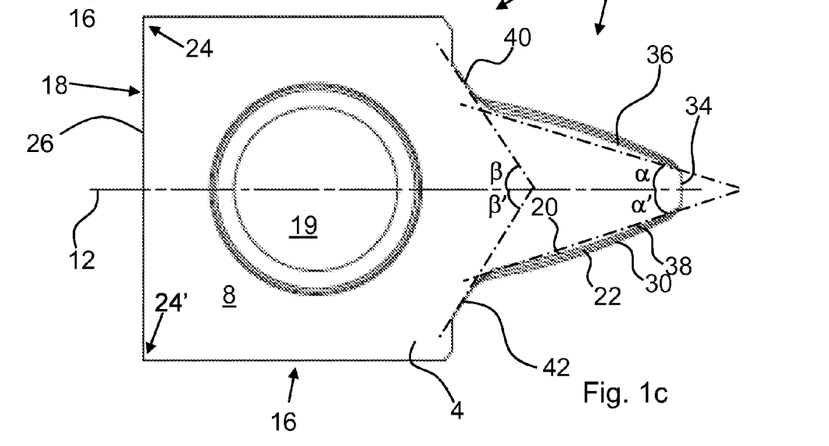
Figure 1D:
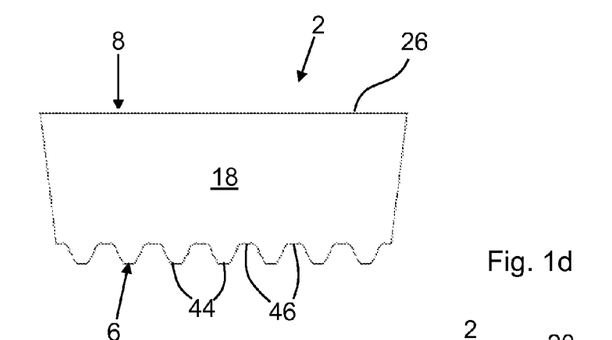
Figure 1E:
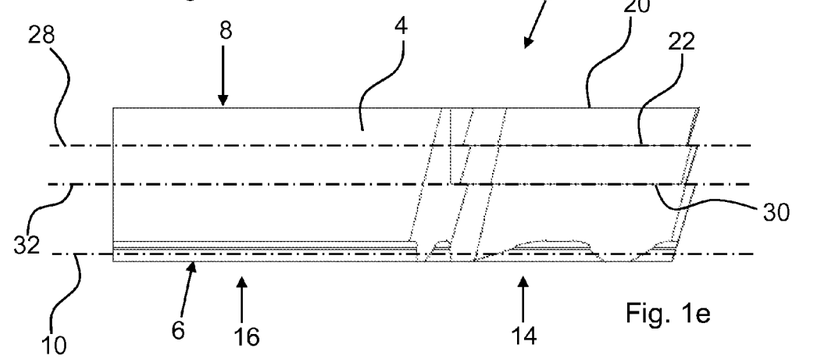

The cutting end portion 14 is provided with a first cutting edge 20 and a second cutting edge 22. The first and second cutting edges 20, 22 are directed in a same cutting direction. Only the cutting end portion 14 is provided with cutting edges and not the positioning end portion 16. The positioning end portion 16 is thus, primarily configured to position the cutting insert 2 in a relevant power skiving tool. In the positioning end portion 16 the upper surface 8 is delimited by two right angle corner portions 24, 24'. An edge 26 of the abutment surface 18 forms an edge of the two right angle corner portions 24, 24'. The positioning end portion 16 has a substantially rectangular shape as seen along the normal of the first plane 10, i.e. as seen in the view of FIG. 1c. The positioning end portion 16 has a width which is wider than a width of the cutting end portion 14, in a direction perpendicularly to the body axis 12 and in parallel with the first plane 10.

The first cutting edge 20 extends along an edge portion of the upper surface 8 and the second cutting edge 22 extends in a second plane 28. Accordingly, a portion of the upper surface 8 forms a rake face of the first cutting edge 20. The second plane 28 is substantially parallel with the first plane 10 and extends between the upper surface 8 and the first plane 10. Seen along a normal to the first plane 10, at least a portion of the second cutting edge 22 extends from the insert body 4 beyond the first cutting edge 20, i.e. as seen in the view of FIG. 1c. The upper surface 8 may be provided with a chip breaking structure adjacent of the first cutting edge 20 (not shown).

In these embodiments, the cutting insert 4 includes a third cutting edge 30. The third cutting edge 30 extends in a third plane 32. The third plane 32 extends substantially in parallel with the first plane 10 and extends between the second plane 28 and the first plane 10. Seen along a normal to the first plane 10, at least a portion of the third cutting edge 30 extends from the insert body 4 beyond the second cutting edge 22, i.e. as seen in the view of FIG. 1c.

Mentioned purely as an example, a cutting depth of the first cutting edge 20 may be within a range of 0.5-2 mm, a cutting depth of the second cutting edge 22 may be within a range of 0.05-0.5 mm, and in embodiments including a third cutting edge 30, a cutting depth of the third cutting edge 30 may be within a range of 0.05-0.5 mm.

Mentioned purely as an example, the second and, if present, the third cutting edge may each extend 0.5-1.5 mm from the insert body 4.

Each of the first, second, and third cutting edges 20, 22, 30 include a nose edge portion 34, a first lateral edge portion 36, and a second lateral edge portion 38. The nose edge portion 34 merges into the first lateral edge portion 36 and the second lateral edge portion 38 on opposite sides of the body axis 12. During use of the cutting insert 2, the nose edge portion 36 may cut at least a portion of a tooth root between two adjacent teeth of a toothed element, and the first and second lateral edge portions 36, 38 may cut flanks of adjacent teeth on both sides of a tooth groove.

As clearly shown in FIG. 1c, portions of the first and second lateral edge portions 36, 38 of the second and third cutting edges 22, 30 may be the above mentioned portion of the second cutting edge 22 extending from the insert body 4 beyond the first cutting edge 20, and the portion of the third cutting edge 30 extending from the insert body 4 beyond the second cutting edge 22.

In these embodiments, each of the first, second, and third cutting edges 20, 22, 30 further include a first ending edge portion 40 and a second ending edge portion 42. The first lateral edge portion 36 extends at an acute angle $\alpha$ to the body axis 12 and merges into the first ending edge portion 40. The second lateral edge portion 38 extends at an acute angle $\alpha'$ to the body axis 12 and merges into the second ending edge portion 42. At least a portion of the first ending edge portion 40 extends at a less acute angle $\beta$ to the body axis 12 than the first lateral edge portion 36 and at least a portion of the second ending edge portion 42 extends at a less acute angle $\beta'$ to the body axis 12 than the second lateral edge portion 38. Accordingly, the first and second ending edge portions 40, 42 are arranged to cut tip portions of teeth of a toothed element. The tip portions of the teeth may at least be chamfered by the first and second ending edge portions 40, 42. Each of the first, second, and third cutting edges 20, 22, 30 may be configured to cut with the first ending edge portion 40, the first lateral edge portion 36, the nose edge portion 34, the second lateral edge portion 38, and the second ending edge portion 42 in one cutting pass on a workpiece.

If the toothed element being cut by a power skiving tool is a cog wheel, the teeth thereof may require at least chamfering of their tip portions. If the toothed element being cut by a power skiving tool is an element comprising splines, the teeth thereof may not require any chamfering of their tip portions. Accordingly, a cutting insert 2 for cutting splines may not require first and second ending edge portions 40, 42 of the cutting edges 20, 22, 30.

According to the embodiments, the second cutting edge 22 may be sharper than the first cutting edge 20. In this manner, a rough cut may be cut in a workpiece with the first cutting edge 20, which accordingly, may be more robust than the second cutting edge 22. A shallower cut may be cut with the second cutting edge 22 than with the first cutting edge 20. Thus, a finishing cut may be cut with the second cutting edge 22. The cutting insert 2 may provide a finishing cut and a surface of the teeth may be sufficiently smooth for use, at least in some applications, of an accordingly cut toothed element. In the embodiments having a third cutting edge 30, the third cutting edge 30 may be substantially as sharp as the second cutting edge 22, alternatively the third cutting edge 30 may be even sharper than the second cutting edge 22. In the embodiments comprising a third cutting edge 30 the finishing cut is cut by the third cutting edge 30.

According to the embodiments, a wedge angle of the first cutting edge 20 may be less than a wedge angle of the second cutting edge 22. In this manner the first cutting edge 20 may be devised for having a deeper cutting depth than the second cutting edge 22. In embodiments having a third cutting edge 30, the third cutting edge 30 may have the same wedge angle as the second cutting edge 22, alternatively the third cutting edge 30 may have a larger wedge angle than the second cutting edge 22.

The wedge angles of the first, second and, if present, third cutting edges may be acute. Mentioned purely as an example, the wedge angle of the first cutting edge 20 may be with a range of 60-87 degrees or within a range of 60-75 degrees. The wedge angle of the second cutting edge 22 may be within a range of 65-75 degrees and a wedge angle of the third cutting edge 30 may be within a range of 65-78 degrees.

The bottom surface 6 is provided with at least one ridge 44 and/or at least one groove 46 extending in parallel with the body axis 12. Thus, the bottom surface 6 is configured to mesh with at least one corresponding groove and/or ridge of a power skiving tool. In these embodiments, the bottom surface 6 is substantially serrated and has seven ridges 44 and eight grooves 46 in the positioning end portion 16, some of which ridges 44 and grooves 46 extend into the cutting end portion 14.

Figure 2:
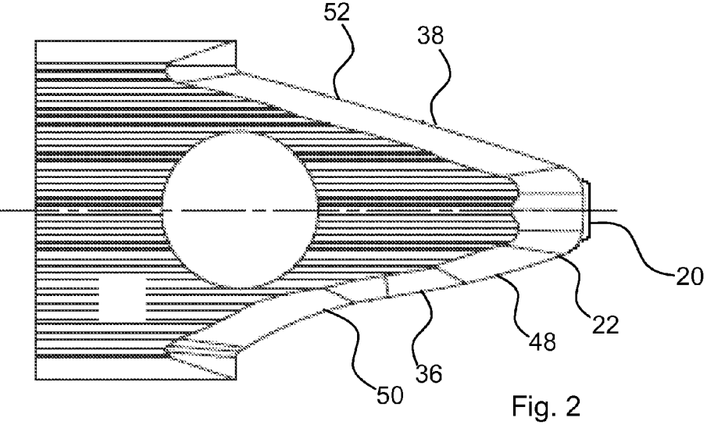
FIG. 2 illustrates embodiments of a cutting insert for a power skiving tool.

FIG. 2 illustrates a cutting insert 2 for a power skiving tool. The embodiment resembles the embodiments of FIGS. 1a-1e for the most part. The cutting insert 2 is configured for cutting inside teeth of a toothed element. The teeth of the toothed element have an involute shape and are longer than the teeth, which may be cut with the cutting insert of the FIG. 1a-1e embodiments. The main differences between the embodiments will be discussed in the following.

The cutting insert 2 has only a first and a second cutting edge 20, 22. Of each first and a second cutting edge 20, 22, the first lateral edge portion 36 has a convexly shaped portion 48 adjacent to a concavely shaped 50 portion and the second lateral edge portion 38 has a convexly shaped portion 52. Due to the shapes of the first and second lateral portions 36, 38, involute tooth flanks on both sides of a tooth groove of an inside cog wheel may be cut with the cutting insert 2. The convexly shaped portion 52 may form the second lateral edge portion 38, i.e. the second lateral edge portion may lack any concavely shaped portion.

However, it is noted that the particular shape of the various portions of the first and second cutting edges 20, 22 depend on several parameters of the teeth of a relevant toothed element, such as the number of teeth and the module of the teeth. It may be noted that for some combinations of the parameters, the first and second lateral edge portions 36, 38 may not require any concave shaped portion to form involute teeth.

FIGS. 3-6 illustrate various views of a rotatable power skiving tool 60 according to the embodiments. The rotatable power skiving tool 60 includes a generally circular tool body 62 having a center axis 64 about which the power skiving tool 60 is rotatable. The tool body 62 has a number of peripherally arranged insert seats 66 arranged on one side of an imaginary reference plane 68. The reference plane 68 extends perpendicularly to the center axis 64. The insert seats 66 face away from the reference plane 68. The power skiving tool 60 includes a cutting insert 2 arranged in each insert seat 66. The cutting inserts 2 are cuttings inserts according to any one aspect and/or embodiment discussed herein.

Figure 3:
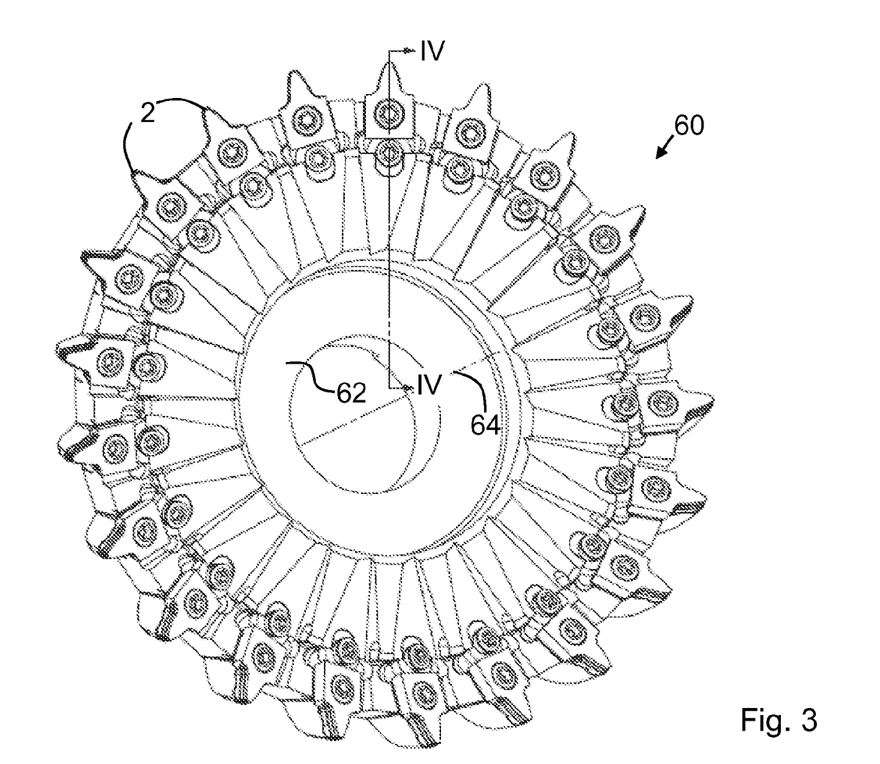
FIG. 3 is a perspective view of a rotatable power skiving tool according to the embodiments.

In these embodiments, the power skiving tool 60 includes 21 insert seats 66 and 21 cutting inserts 2. Other embodiments may have less or more insert seats and cutting inserts.

Figure 4:
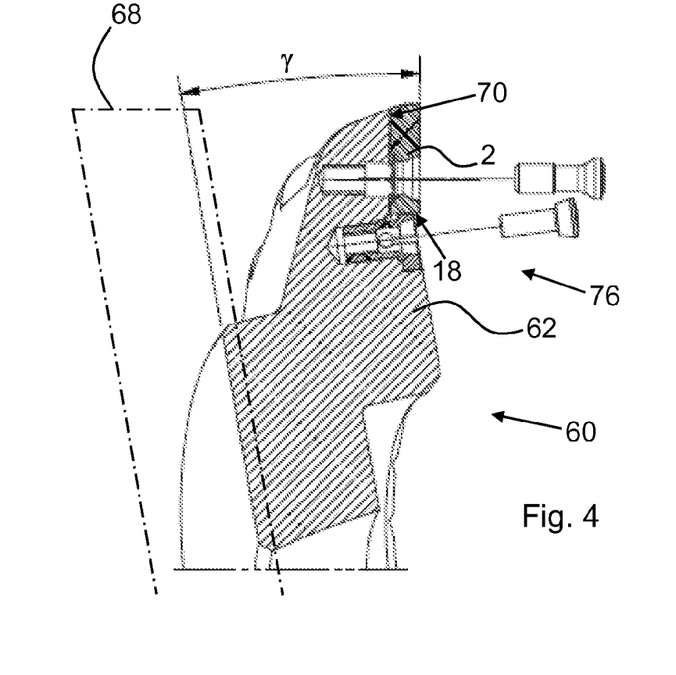
FIG. 4 is a cross-sectional view of the rotatable power skiving tool taken along line IV-IV of FIG. 3.

As shown in the cross-sectional view of FIG. 4, the seat bottom surface 70 of each insert seat 66, in a direction radially from the center axis 64, forms an angle $\gamma$ of approximately 10 degrees with the reference plane 68. In alternative embodiments, the angle $\gamma$ may be within a range of 2-15 degrees with the reference plane 68.

Figure 6:
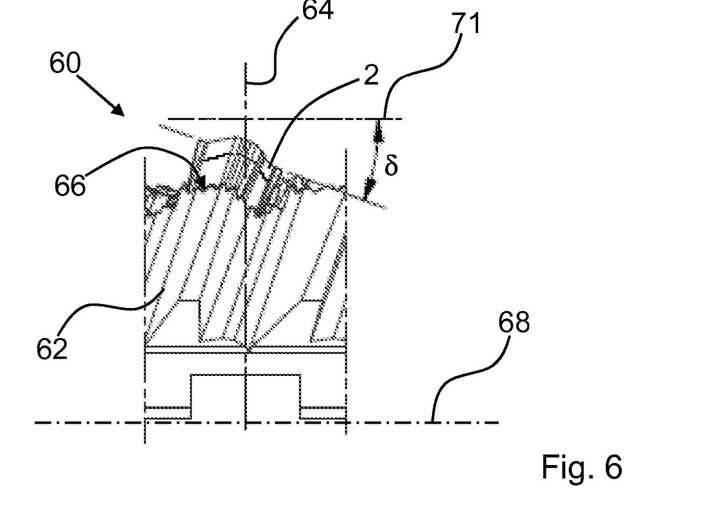
FIG. 6 is a partial side view of the insert seat of FIG. 5

As shown in the partial side view of FIG. 6, the seat bottom surface 70 of each insert seat 66, in a direction tangential to the generally circular tool body 62 forms an angle $\delta$ approximately 20 degrees with the reference plane 68. In alternative embodiments the angle $\delta$ may be within a range of 0-30 degrees. (To simplify FIG. 6, the angle $\delta$ has been illustrated in relation to a plane 71 extending in parallel with the reference plane 68.)

Figure 5:
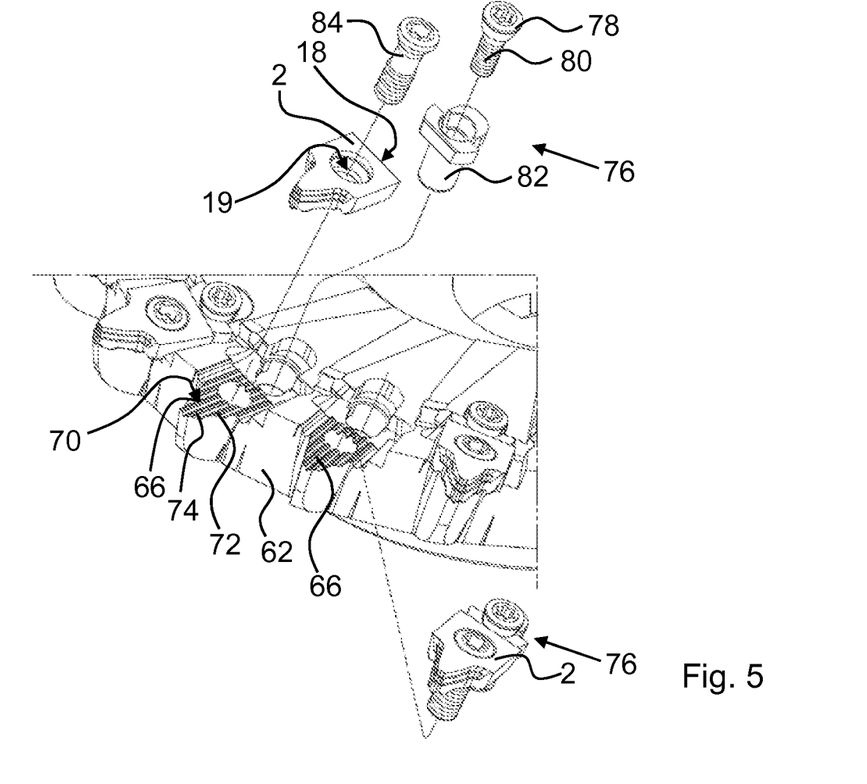
FIG. 5 is an enlarged partial view of the rotatable power skiving tool of FIG. 3.

According to the embodiments, a seat bottom surface 70 of each insert seat 68 is provided with ridges 72 and grooves 74, see FIG. 5. Thus, the serrated bottom surfaces of the cutting inserts 2 may be supported in the insert seats 66. Moreover, the ridges 72 and the grooves 74 permit adjustment of a radial position of the cutting insert 2 in the power skiving tool 60.

The power skiving tool 60 includes an adjusting mechanism 76 for adjusting a radial position of the cutting insert 2 arranged radially inside of each insert seat 66, see FIGS. 4 and 5. The adjusting mechanism 76 abutting against the abutment surface 18 of the cutting insert 2. The cutting inserts 2 may be fine positioned in a direction along the body axes of the cutting inserts 2 by the adjusting mechanism 76. The adjusting mechanism 76 may be an adjusting mechanism as disclosed in WO 03/045613.

Briefly with reference to FIG. 5, the adjusting mechanism 76 includes a wedge element in the form of a conical head 78 on a set screw 80, as well as a sleeve 82 mountable to the tool body 62 of the power skiving tool 60. Two jaws are included in the sleeve 82. A front surface of the first jaw is pressed against the abutment surface 18 of the cutting insert 2, whereby the cutting insert 2 is kept in a basic position. When the cutting insert 2 is to be finely-adjusted, the second jaw is activated by tightening the set screw 80, whereby the second jaw supports itself against the tool body 62, and then the first jaw is set in motion forwards in order to push out the cutting insert 2 in fine steps, e.g. of 0.001 mm. For further details of the adjusting mechanism 76 reference is made to WO 03/045613.

This disclosure should not be construed as limited to the embodiments set forth herein. A person skilled in the art will realize that different features of the embodiments disclosed herein may be combined to create embodiments other than those described herein, without departing from the scope of the present disclosure, as defined by the appended claims. Although the disclosure has been described with reference to example embodiments, many different alterations, modifications and the like will become apparent for those skilled in the art. Therefore, it is to be understood that the foregoing is illustrative of various example embodiments and that the disclosure is defined only by the appended claims.

The invention claimed is:

1. A cutting insert for a power skiving tool, the cutting insert comprising:
an insert body having a bottom surface generally extending in a first plane and being configured to abut against a corresponding surface of the power skiving tool, an upper surface extending opposite to the bottom surface, and a body axis extending substantially in parallel with the first plane, wherein as seen along the body axis the insert body includes a cutting end portion and opposite thereto an abutment surface configured to abut against a corresponding surface of the power skiving tool, wherein the abutment surface extends substantially perpendicularly to the body axis and to the first plane, wherein the cutting end portion is provided with a first cutting edge and a second cutting edge, the first cutting edge and the second cutting edge being directed in a same cutting direction, wherein the first cutting edge extends along an edge portion of the upper surface and the second cutting edge extends in a second plane, the second plane being substantially parallel with the first plane and extending between the upper surface and the first plane, and as seen along a normal to the first plane at least a portion of the second cutting edge extends from the insert body beyond the first cutting edge.

2. The cutting insert according to claim 1, wherein the upper surface extends substantially in parallel with the first plane.

3. The cutting insert according to claim 1, wherein each of the first and second cutting edges includes a nose edge portion, a first lateral edge portion, and a second lateral edge portion, the nose edge portion merging into the first lateral edge portion and the second lateral edge portion.

4. The cutting insert according to claim 3, wherein each of the first and second cutting edges has a first ending edge portion and a second ending edge portion, wherein the first lateral edge portion extends at an acute angle to the body axis and merges into the first ending edge portion and the second lateral edge portion extends at an acute angle to the body axis and merges into the second ending edge portion, and wherein at least a portion of the first ending edge portion extends at a less acute angle to the body axis than the first lateral edge portion and at least a portion of the second ending edge portion extends at a less acute angle to the body axis than the second lateral edge portion, such that the first ending edge portion and the second ending edge portion are arranged to cut tip portions of teeth.

5. The cutting insert according to claim 4, wherein each of the first and second cutting edges is configured to cut with the first ending edge portion, the first lateral edge portion, the nose edge portion, the second lateral edge portion, and the second ending edge portion in one cutting pass on a workpiece.

6. The cutting insert according to claim 3, wherein the first lateral edge portion has a convexly shaped portion adjacent to a concavely shaped portion and the second lateral edge portion has a convexly shaped portion.

7. The cutting insert according to claim 1, wherein the second cutting edge is sharper than the first cutting edge.

8. The cutting insert according to claim 1, wherein a wedge angle of the first cutting edge is less than a wedge angle of the second cutting edge.

9. The cutting insert according to claim 1, further comprising a third cutting edge, wherein the third cutting edge extends in a third plane, the third plane being substantially parallel with the first plane and extending between the second plane and the first plane, and wherein the third cutting edge includes a nose edge portion, a first lateral edge portion, and a second lateral edge portion, the nose edge portion merging into the first lateral edge portion and the second lateral edge portion.

10. The cutting insert according to claim 1, wherein as seen along the body axis opposite to the cutting end portion, the insert body includes a positioning end portion configured to position the cutting insert in a power skiving tool, the upper surface being delimited by two right angle corner portions in the positioning end portion, wherein an edge of the abutment surface forms an edge of the two right angle corner portions, and wherein only the cutting end portion is provided with cutting edges.

11. The cutting insert according to claim 10, wherein the positioning end portion has a substantially rectangular shape as seen along the normal of the first plane, and wherein the positioning end portion has a width which is wider than a width of the cutting end portion, in a direction perpendicularly to the body axis and in parallel with the first plane.

12. The cutting insert according to claim 10, wherein a through-hole extends through the insert body between the bottom surface and the upper surface of the insert body, at least partially in the positioning end portion.

13. The cutting insert according to claim 1, wherein the bottom surface is provided with at least one ridge and/or at least one groove extending in parallel with the body axis and being configured to mesh with at least one corresponding groove and/or ridge of a power skiving tool.

14. A rotatable power skiving tool comprising:
a generally circular tool body having a center axis about which the power skiving tool is rotatable, the tool body including a number of peripherally arranged insert seats arranged on one side of a reference plane, the reference plane extending perpendicularly to the center axis, wherein the insert seats face away from the reference plane; and
a cutting insert arranged in each of a respective insert seat, the cutting insert including an insert body having a bottom surface generally extending in a first plane and being configured to abut against a corresponding surface of the power skiving tool, an upper surface extending opposite to the bottom surface, and a body axis extending substantially in parallel with the first plane, wherein as seen along the body axis the insert body includes a cutting end portion and opposite thereto an abutment surface configured to abut against a corresponding surface of the power skiving tool, wherein the abutment surface extends substantially perpendicularly to the body axis and to the first plane, wherein the cutting end portion is provided with a first cutting edge and a second cutting edge, the first cutting edge and the second cutting edge being directed in a same cutting direction, wherein the first cutting edge extends along an edge portion of the upper surface and the second cutting edge extends in a second plane, the second plane being substantially parallel with the first plane and extending between the upper surface and the first plane, and as seen along a normal to the first plane at least a portion of the second cutting edge extends from the insert body beyond the first cutting edge.

15. The rotatable power skiving tool according to claim 14, wherein a seat bottom surface of each insert seat, in a direction radially from the center axis, forms an angle ($\gamma$) within a range of 2-15 degrees, preferably approximately 10 degrees, with the reference plane.

16. The rotatable power skiving tool according to claim 15, wherein the seat bottom surface of each insert seat, in a direction tangential to the generally circular tool body, forms an angle (δ) of a maximum of 30 degrees with the reference plane.

17. The rotatable power skiving tool according to claim 15, wherein the seat bottom surface of each insert seat is provided with ridges and grooves.

18. The rotatable power skiving tool according to claim 14, further comprising an adjusting mechanism for adjusting a radial position of the cutting insert arranged radially inside of each insert seat, the adjusting mechanism abutting against the abutment surface of the cutting insert.

19. The cutting insert according to claim 12, wherein the through-hole extends through the insert body between the bottom surface and the upper surface of the insert and is located entirely in the positioning end portion.

20. The rotatable power skiving tool according to claim 14, wherein a seat bottom surface of each insert seat, in a direction radially from the center axis, forms an angle (γ) of approximately 10 degrees with the reference plane.

21. The rotatable power skiving tool according to claim 15, wherein the seat bottom surface of each insert seat, in a direction tangential to the generally circular tool body, forms an angle (δ) of approximately 20 degrees with the reference plane.

22. The rotatable power skiving tool according to claim 16, wherein the seat bottom surface of each insert seat is provided with ridges and grooves.

\* \* \* \* \*